US011329926B2

(12) United States Patent
Liu et al.

(10) Patent No.: US 11,329,926 B2
(45) Date of Patent: May 10, 2022

(54) MEASURING TRANSMISSION DELAY

(71) Applicant: ZTE Corporation, Guangdong (CN)

(72) Inventors: Yang Liu, Guangdong (CN); Zhuang Liu, Guangdong (CN); He Huang, Guangdong (CN)

(73) Assignee: ZTE Corporation, Guangdong (CN)

(*) Notice: Subject to any disclaimer, the term of this patent is extended or adjusted under 35 U.S.C. 154(b) by 0 days.

(21) Appl. No.: 17/061,392

(22) Filed: Oct. 1, 2020

(65) Prior Publication Data

US 2021/0021534 A1 Jan. 21, 2021

Related U.S. Application Data

(63) Continuation of application No. PCT/US2018/081794, filed on Apr. 4, 2018.

(51) Int. Cl.
*H04L 47/283* (2022.01)
*H04W 56/00* (2009.01)
*H04L 43/106* (2022.01)
*H04L 43/0852* (2022.01)

(52) U.S. Cl.
CPC ........ *H04L 47/283* (2013.01); *H04L 43/0852* (2013.01); *H04L 43/106* (2013.01); *H04W 56/001* (2013.01)

(58) Field of Classification Search
CPC . H04L 47/283; H04L 43/0852; H04L 43/106; H04W 56/001
See application file for complete search history.

(56) References Cited

U.S. PATENT DOCUMENTS

2005/0163064 A1 7/2005 Choi et al.
2007/0189184 A1 8/2007 Ryu et al.
2009/0109893 A1* 4/2009 Gopal ................... H04L 65/80
370/350

(Continued)

FOREIGN PATENT DOCUMENTS

CN 101004641 A 7/2007
CN 101753273 A 6/2010

(Continued)

OTHER PUBLICATIONS

International Search Report and Written Opinion, PCT/CN2018/081794 dated Dec. 10, 2018, 4 pages.

(Continued)

*Primary Examiner* — Donald L Mills
(74) *Attorney, Agent, or Firm* — Perkins Coie LLP

(57) ABSTRACT

An example technique for communicating transmission delay includes receiving, at a first communication node, delay information from a second communication node for data packets transmitted from the second communication node to the first communication node, determining, by the first communication node, a transmission delay of the data packets based on the delay information, receiving, at the first communication node, a first message from a third communication node requesting the transmission delay of the data packets; and transmitting, from the first communication node in response to the first message, a second message to the third communication node, the second message including the transmission delay for the data packets.

16 Claims, 13 Drawing Sheets

(56) References Cited

U.S. PATENT DOCUMENTS

| | | | | |
|---|---|---|---|---|
| 2011/0090814 A1* | 4/2011 | Legg | ........................ | H04L 47/10 370/252 |
| 2015/0029873 A1* | 1/2015 | Subramanian | ............ | G01S 5/14 370/252 |
| 2015/0295797 A1* | 10/2015 | Kneckt | ............. | H04W 56/0045 370/252 |
| 2017/0201943 A1 | 7/2017 | Hsu et al. | | |
| 2019/0089614 A1* | 3/2019 | Tang | ................. | H04W 72/1236 |

FOREIGN PATENT DOCUMENTS

| | | |
|---|---|---|
| CN | 103780454 A | 5/2014 |
| CN | 104185193 A | 12/2014 |
| CN | 106162685 A | 11/2016 |
| CN | 106162730 A | 11/2016 |
| CN | 106455038 A | 2/2017 |
| CN | 107371155 A | 11/2017 |
| EP | 2800429 | 5/2014 |
| JP | 2017-519464 | 7/2017 |
| KR | 2009-0027022 A | 3/2009 |
| KR | 101775728 | 9/2017 |
| WO | 2018/009340 A | 1/2018 |

OTHER PUBLICATIONS

Office Action for Corresponding Korean Application No. 10-2020-7031349 dated Aug. 30, 2021, 12 pages, unofficial summary translation.

Office Action for Corresponding Chinese Application No. 2018800909294 dated Apr. 16, 2021, 15 pages, unofficial translation.

European Extended Search Report and Written Opinion, Appl. No. EP 18913280 dated Apr. 9, 2021, 11 pages.

ZTE Corporation, "Discussion on the function split between CU and DU" 3GPP TSG RAN WG2 #93bis, Dubrovnik, Croatia, Apr. 11-15, 2016, 5 pages.

Second Office Action for Corresponding Chinese Application No. 2018800909294 dated Dec. 2, 2021, 9 pages with unofficial translation.

Office Action for Corresponding Japanese Application No. 2020-554227 dated Jan. 4, 2022, 10 pages, with machine translation.

* cited by examiner

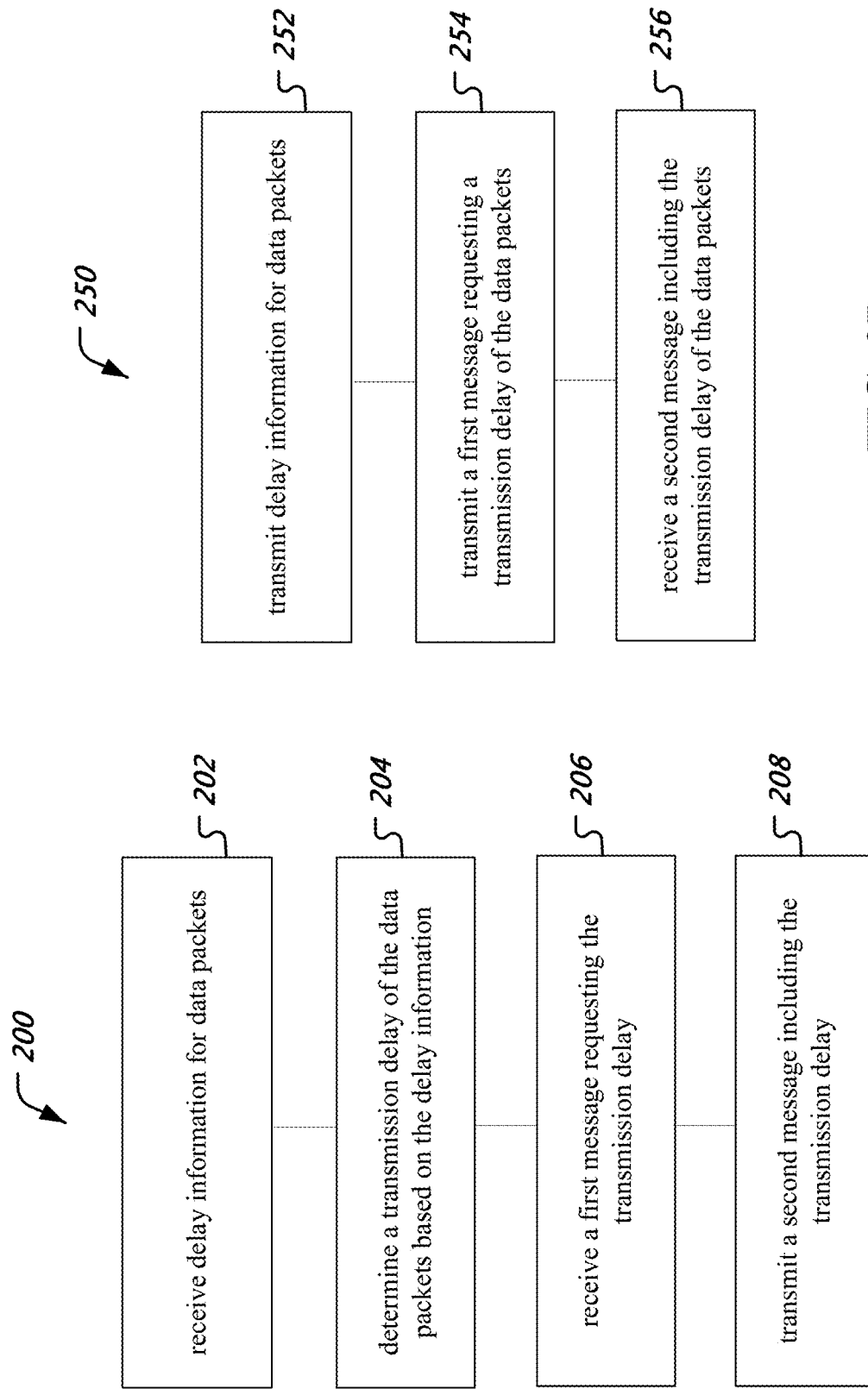

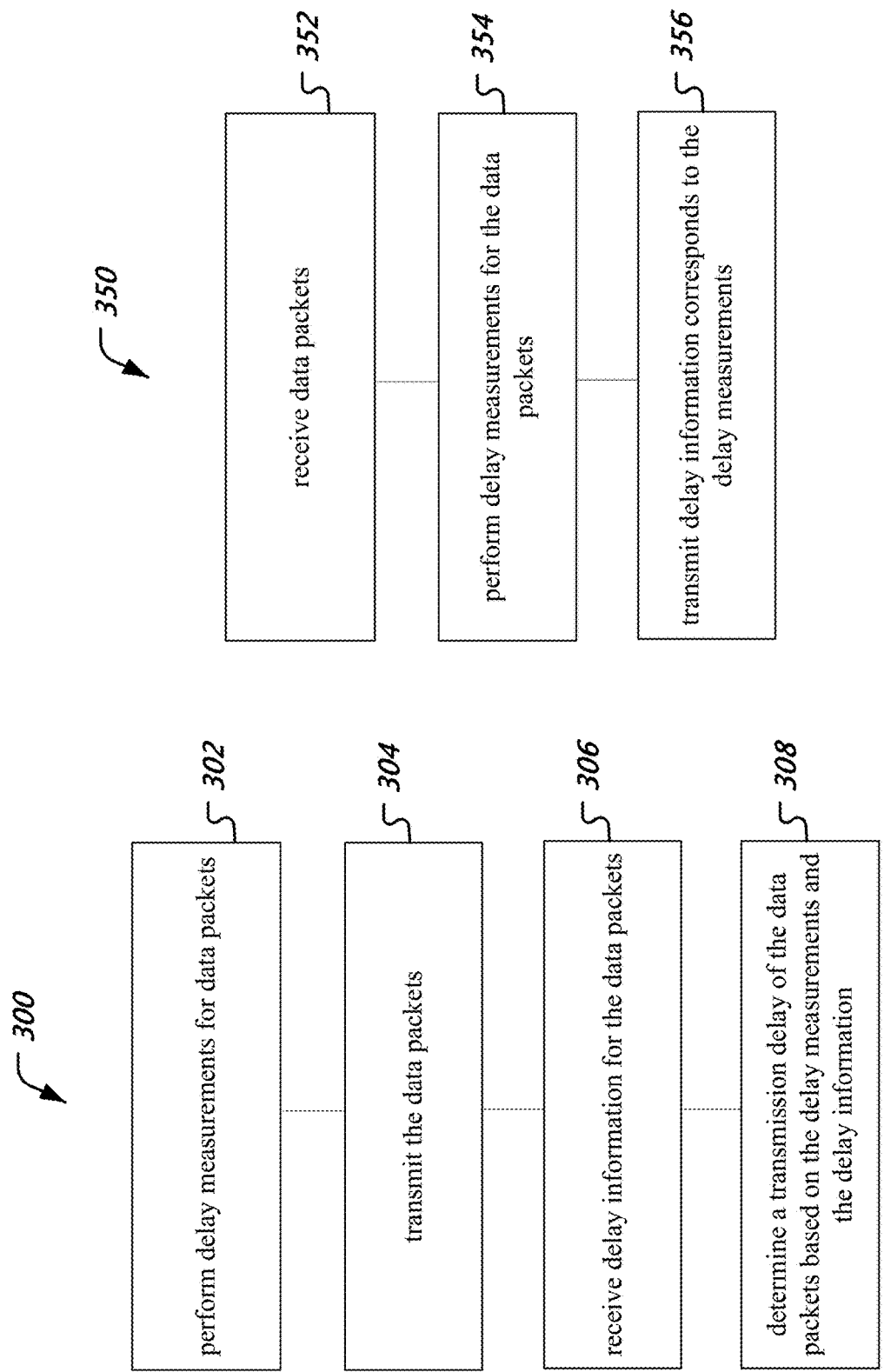

MEASURING TRANSMISSION DELAY

CROSS-REFERENCE TO RELATED APPLICATION(S)

This patent document is a continuation of and claims benefit of priority to International Application No. PCT/CN2018/081794, filed on Apr. 4, 2018. The entire content of the before-mentioned patent application is incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to measurement of transmission delays in a communication system.

In one representative aspect, a method for wireless communication is disclosed. The method includes receiving, at a first communication node (e.g., a Distributed Unit DU), delay information from a second communication node for data packets transmitted from the second communication node to the first communication node. The method includes determining, by the first communication node, a transmission delay of the data packets based on the delay information. The method includes receiving, at the first communication node, a first message from a third communication node requesting the transmission delay of the data packets. The method further includes transmitting, from the first communication node in response to the first message, a second message to the third communication node. The second message includes the transmission delay for the data packets.

In another representative aspect, a method for wireless communication is disclosed. The method includes transmitting, from a first communication node, delay information to a second communication node for data packets transmitted from the first communication node to the second communication node. The method includes transmitting, from the first communication node, a first message to a third communication node requesting a transmission delay of the data packets. The method further includes receiving, at the first communication node, a second message from the third communication in response to the first message, the second message including the transmission delay of the data packets.

In another representative aspect, a method for wireless communication is disclosed. The method includes performing, by a first communication node, delay measurements for data packets that are received at the first communication node. The method includes transmitting the data packets to a second communication node. The method includes receiving, at the first communication node, delay information for the data packets from the second communication node. The method further includes determining, by the first communication node, a transmission delay of the data packets based on at least one of (1) the delay measurements or (2) the delay information.

In another representative aspect, a wireless communication method is disclosed. The method includes receiving, at a first communication node, data packets from a second communication node. The method includes performing, by the first communication node, delay measurements for the data packets. The method further includes transmitting, from the first communication node, delay information to the second communication node. The delay information corresponds to the delay measurements for assisting the second communication node to determine a transmission delay of the data packets.

In another representative aspect, a wireless communications apparatus comprising a processor is disclosed. The processor is configured to implement a method described herein.

In yet another representative aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

BRIEF DESCRIPTION OF THE DRAWINGS

FIG. 2A is a flowchart representation of a method for wireless communication.

FIG. 2B is a flowchart representation of another method for wireless communication.

FIG. 3A is a flowchart representation of another method for wireless communication.

FIG. 3B is a flowchart representation of yet another method for wireless communication.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

As NR emerges in the wireless market, the large amount of connections and the high transmission rates can present challenges to the existing Common Public Radio Interface (CPRI) interface between the Baseband Unit (BBU) and the Remote Radio Unit (RRU). Because what transmitted over the CPRI interface is the In-phase and Quadrature (I/Q) data that is coded and modulated through the physical layer, the corresponding bit rates are high. Thus, minimizing transmission delay and optimizing bandwidth usage on the CPRI interface can be demanding. With the speed of the 5G air interface increasing to tens of Giga bytes per second (Gbps), the bandwidth of the CPRI interface increases accordingly to the level of Tera bytes per second, which puts tremendous pressure on the deployment of the fronthaul network interface.

Figure 1B:
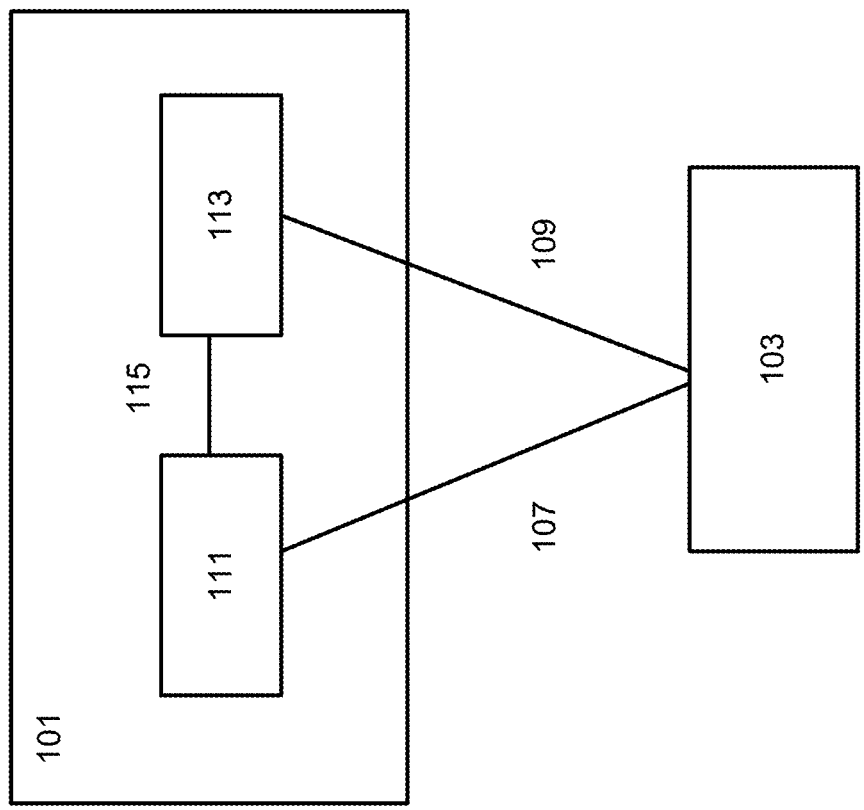
FIG. 1B shows another exemplary schematic diagram of a system architecture of two information elements connected via a fronthaul interface.
Figure 1A:
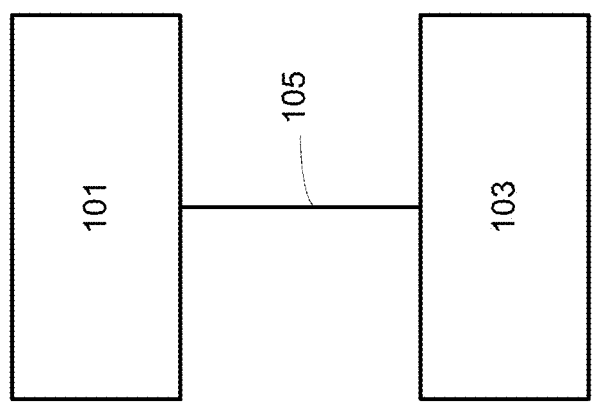
FIG. 1A shows an exemplary schematic diagram of a system architecture of two information elements connected via a fronthaul interface.

Therefore, it is desirable to design a fronthaul network interface that can account for transmission capacity, transmission delay, and deployment cost of the NR wireless communication systems. FIG. 1A shows a schematic diagram of a system architecture of two information elements connected via a fronthaul interface. A first network element 101, also referred to as a Centralized Unit (CU), can be used to perform delay-insensitive network functions. A second network element 103, also referred to as a Distributed Unit (DU), can be used to perform delay-sensitive network functions. The CU 101 and the DU 103 are in communication with each other via an interface 105 (e.g., the F1 interface).

Furthermore, the control plane (CP) and the user plane (UP) of the information elements—the two logically separated components—can become physically separated in the NR communication systems to further account for transmission delay, load balancing, multi-vendor device interoperability, and/or deployment cost. FIG. 1B shows another exemplary schematic diagram of a system architecture of two information elements connected via a fronthaul interface. In FIG. 1B, the CP 111 and UP 113 of the first information element 101 are deployed in different geographical locations. The CP 111 and UP 113 are in communication with each via a first interface 115 (e.g., E1 interface). The CP 111 can be in communication with the DU 103 via a second interface 107 (e.g., the F1-C interface). The UP 113 can be in communication with the DU 103 via a third interface 109 (e.g., the F1-U interface). Physically separated CP and UP components can be independently configured, thereby allowing more flexibility and efficiency to meet various business requirements in the 5G era.

With the separation of information elements for delay-sensitive and delay-insensitive functions, and the separation of CP and UP components of the information elements, self-organizing (SON) capabilities of the information elements become important to improve performance of the network. In particular, the SON data delay measurement function is one of the basic functions that can effectively detect the transmission delay of data packets. It can be used to observe the quality of service of the network and to enable self-optimization. However, there is currently no data delay measurement solution for separated information elements.

This document describes techniques that can be used in various embodiments to measure and obtain transmission delay of data packets by separated information elements (e.g., CU and/or DU) in an NR network. The disclosed techniques can be used in various embodiments to realize self-optimization of the NR network and achieve optimal performance of the network.

FIG. 2A is a flowchart representation of a method 200 for wireless communication. The method 200 includes, at 202, receiving, at a first communication node (e.g., a DU), delay information from a second communication node for data packets transmitted from the second communication node to the first communication node. The method 200 includes, at 204, determining, by the first communication node, a transmission delay of the data packets based on the delay information. In some embodiments, the delay information at a particular communication node can be the time duration in which a data packet is transmitted from the communication node to a corresponding User Equipment (UE). The method 200 includes, at 206, receiving, at the first communication node, a first message from a third communication node requesting the transmission delay of the data packets. The method 200 further includes, at 208, transmitting, from the first communication node in response to the first message, a second message to the third communication node. The second message includes the transmission delay for the data packets.

In some embodiments, determining the transmission delay of the data packets includes performing, by the first communication node, delay measurements of the data packets, and computing, by the first communication node, the transmission delay of the data packets based on the delay information and the delay measurements.

In some embodiments, the second communication node is same as the third communication node (e.g., they are both the same CU). The delay information can be carried in a message that is transmitted via a first component of the second communication node for carrying control traffic (e.g., CP). The delay information can also be carried in a data frame that is transmitted via a second component of the second communication node for carrying data traffic (e.g., UP).

In some embodiments, the second communication node is different than the third communication node. For example, the second communication node is a different DU, and the third communication node is an CU. The delay information can be carried in a data frame transmitted from the second communication node.

In some embodiments, the second communication node is configured to receive the delay information from the third communication node and forward the delay information to the first communication node.

In some embodiments, the delay information includes a timestamp for each data packet. The timestamp indicates a time at which the corresponding data packet is received at the second communication node. In some embodiments, the delay information includes a time duration for each data packet. The time duration indicates an amount of delay for the corresponding data packet at the second communication node.

In some embodiments, determining the transmission delay of the data packets comprises computing an average delay value based on the delay information.

FIG. 2B is a flowchart representation of a method 250 for wireless communication. The method 250 includes, at 252, transmitting, from a first communication node (e.g., CU), delay information to a second communication node for data packets transmitted from the first communication node to the second communication node. The method 250 includes, at 254, transmitting, from the first communication node, a first message to a third communication node requesting a transmission delay of the data packets. The method 250 further includes, at 256, receiving, at the first communication node, a second message from the third communication in response to the first message, the second message including the transmission delay of the data packets.

In some embodiments, the second communication node is same as the third communication node (e.g., the same DU). In some embodiments, the second communication node is different than the third communication node (e.g., different DUs).

In some embodiments, the delay information is carried in a message that is transmitted via a first component of the first communication node for carrying control traffic (e.g., CP). In some embodiments, the delay information is carried in a data frame that is transmitted via a second component of the first communication node for carrying data traffic (e.g., UP).

In some embodiments, the delay information includes a timestamp for each data packet. The timestamp indicates a time at which the corresponding data packet is received at the first communication node. In some embodiments, the delay information includes a time duration for each data packet. The time duration indicates an amount of delay for the corresponding data packet at the first communication node. In some embodiments, the transmission delay of the data packets corresponds to an average delay value determined based on the delay information.

FIG. 3A is a flowchart representation of a method 300 for wireless communication. The method 300 includes, at 302, performing, by a first communication node (e.g., a CU), delay measurements for data packets that are received at the first communication node. The method 300 includes, at 304, transmitting the data packets to a second communication node. The method 300 includes, at 306, receiving, at the first communication node, delay information for the data packets from the second communication node. The method 300 further includes, at 308, determining, by the first communication node, a transmission delay of the data packets based on at least one of (1) the delay measurements or (2) the delay information.

In some embodiments, the method includes transmitting, by the first communication node, a first message to the second communication node requesting the delay information for the data packets.

In some embodiments, the delay information is carried in a second message that is transmitted to a first component of the first communication node for carrying control traffic (e.g., CP). In some embodiments, the delay information is carried in a data frame that is transmitted to a second component of the first communication node for carrying data traffic (e.g., UP).

In some embodiments, the first communication node comprises a first component for carrying control traffic and a second component for carrying data traffic. The delay measurements are performed by the second component of the first communication node and the transmission delay of the data packets is determined by the first component of the first communication node. In some implementations, the method further includes transmitting, from the first component, a third message to the second component requesting delay information for the data packets, and receiving, at the first component, a fourth message from the second component in response to the third message, the fourth message including the delay information.

In some embodiments, the delay information includes a timestamp for each data packet. The timestamp indicates a time at which the corresponding data packet is received at the second communication node. In some embodiments, the delay information includes a time duration for each data packet. The time duration indicates an amount of delay for the corresponding data packet at the second communication node.

In some embodiments, determining the transmission delay of the data packets comprises computing an average delay value based on the delay measurements and the delay information.

FIG. 3B is a flowchart representation of a method 350 for wireless communication. The method 350 includes, at 352, receiving, at a first communication node, data packets from a second communication node. The method 350 includes, at 354, performing, by the first communication node, delay measurements for the data packets. The method 350 further includes, at 356, transmitting, from the first communication node, delay information to the second communication node. The delay information corresponds to the delay measurements for assisting the second communication node to determine a transmission delay of the data packets.

In some embodiments, the method includes receiving, at the first communication node, a first message from the second communication node requesting the delay information for the data packets.

In some embodiments, the delay information is carried in a second message that is transmitted via a first component of the second communication node for carrying control traffic. In some embodiments, the delay information is carried in a data frame that is transmitted via a second component of the second communication node for carrying data traffic.

In some embodiments, the delay information includes a timestamp for each data packet, the timestamp indicating a time at which the corresponding data packet is received at the first communication node. In some embodiments, the delay information includes a time duration for each data packet, the time duration indicating an amount of delay for the corresponding data packet at the first communication node. In some embodiments, the transmission delay of the data packets corresponds to an average delay value determined based on the delay information.

Figure 4:
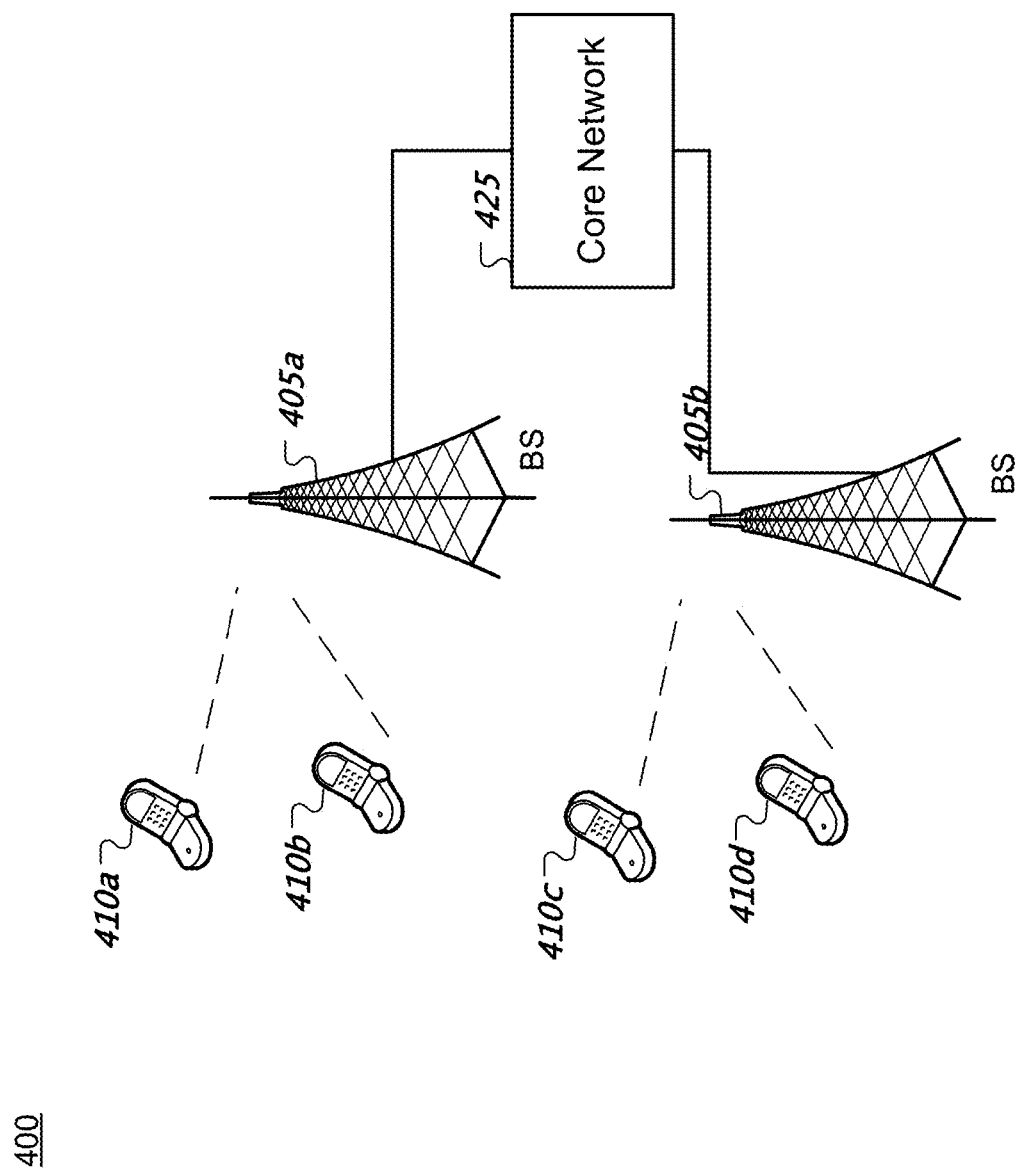
FIG. 4 shows an example of a wireless communication system where techniques in accordance with one or more embodiments of the present technology can be applied.

FIG. 4 shows an example of a wireless communication system 400 where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 5:
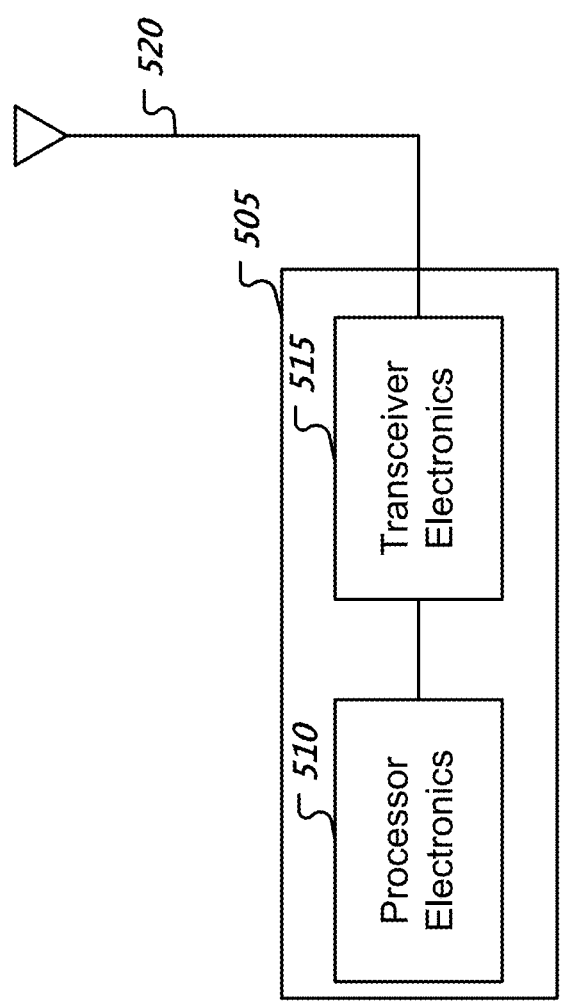
FIG. 5 is a block diagram representation of a portion of a radio station.

FIG. 5 is a block diagram representation of a portion of a radio station. A radio station 455 such as a base station or a wireless device (or UE) can include processor electronics 450 such as a microprocessor that implements one or more of the wireless techniques presented in this document. The radio station 455 can include transceiver electronics 465 to send and/or receive wireless signals over one or more communication interfaces such as antenna 470. The radio station 455 can include other communication interfaces for transmitting and receiving data. Radio station 455 can include one or more memories (not explicitly shown) configured to store information such as data and/or instructions. In some implementations, the processor electronics 450 can include at least a portion of the transceiver electronics 465. In some embodiments, at least some of the disclosed techniques, modules or functions are implemented using the radio station 455.

Details of the disclosed techniques are described in the following example embodiments.

Example Embodiment 1

Figure 6:
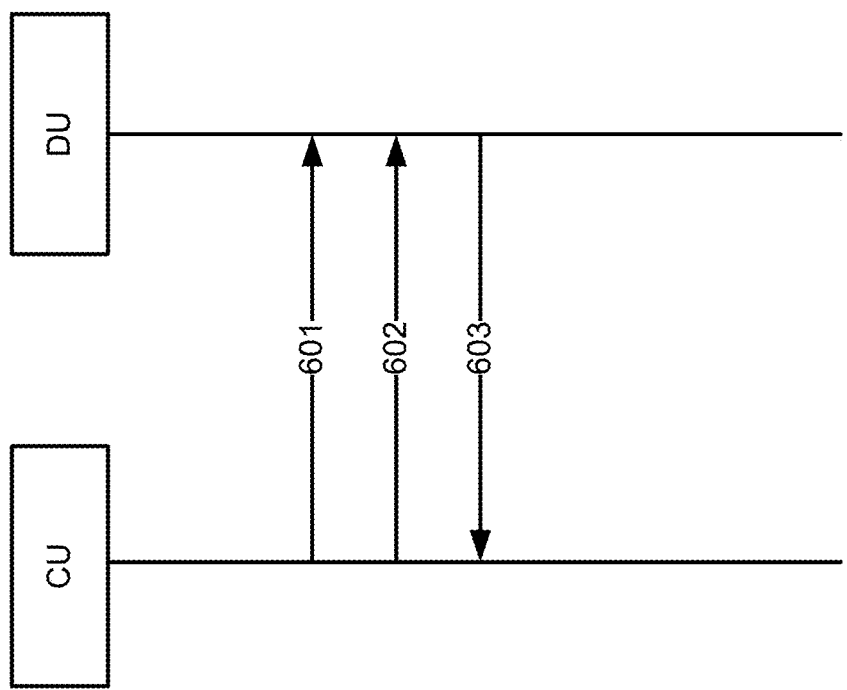
FIG. 6 shows a representative signaling procedure between a Centralized Unit (CU) and a DU for obtaining a transmission delay for data packets.

FIG. 6 shows a representative signaling procedure between a CU and a DU for obtaining a transmission delay for data packets. In this embodiment, the delay is computed on the DU side. The CP and the UP of the CU are not separated.

The CU first gathers delay information for data packets that are received at the CU. In some embodiments, the CU gathers delay information for N data packets, wherein N is a predetermined number. In some implementations, the CU gathers delay information for the data packets that are received within a predetermined time duration $T_s$.

In some embodiments, the delay information includes the delay for each of the data packets arriving at the CU. For example, data packet $d_k$ arrives at the CU at time $t_{a1(k)}$. The data packet $d_k$ is transmitted from the CU to the DU at $t_{b1(k)}$. Thus, the delay at the CU for data packet $d_k$ is $t_{1(k)} = t_{b1(k)} - t_{a1(k)}$. For each of the data packet $1 \leq i \leq N$, the corresponding delay at the CU is $t_{1(i)}$. The data packets are subsequently forwarded to the DU.

The CU then, at step 601, transmits the delay information to the DU. In this embodiment, because the CP and the UP of the CU are not separated, the delay information can be included in a message (e.g., Delay Measurement Assistant Information) and transmitted via the CP of the CU. In some embodiments, the CU can compute an average value of $t_{1(i)}$:

$$T_1 = \frac{\sum_{i=1}^{N} t_{1(i)}}{N},$$

and transmit the average value $T_1$ to the DU via the message.

On the DU side, DU also gathers delay information for the data packets that are received at the DU from the CU. The DU may gather delay information for N data packets, or within a predetermined time duration $T_s$.

In some embodiments, the delay information includes the delay at the DU for each of the data packets it received from the CU. For example, data packet $d_k$ arrives at the DU at time $t_{a2(k)}$. The data packet $d_k$ is then transmitted to a User Equipment (UE). An acknowledge (ACK) corresponding to the data packet $d_k$ is received at the DU at time $t_{b2(k)}$. Thus, the delay for data packet $d_k$ is $t_{2(k)} = t_{b2(k)} - t_{a2(k)}$. For each of the data packet $1 \leq i \leq N$, the corresponding delay at the DU is $t_{2(i)}$. In some embodiments, the DU can compute an average value:

$$T_2 = \frac{\sum_{i=1}^{N} t_{2(i)}}{N}.$$

After the DU obtains both $t_{1(i)}$ and $t_{2(i)}$ for N data packets, the DU can compute an average transmission delay for the data packets:

$$T = \frac{\sum_{i=1}^{N} (t_{1(i)} + t_{2(i)} + t_F)}{N}.$$

In some embodiments, the DU computes the average transmission delay as follows: $T = T_1 + T_2 + t_F$. Here, $t_F$ is the time delay of the fronthaul interface (e.g., F1 interface) between the CU and the DU. The value of $t_F$ can be a fixed (and optionally preconfigured) value, or be obtained based on measurements.

The CU transmits, at 602, a first message (e.g., a Time Delay Request) to the DU to request the transmission delay. The first message can include at least one of the following types of information: an identifier for the CU, an identifier for the DU, and/or information of the measured object(s). The identifier for the CU can be the CU Identity (ID) and/or the Internet Protocol (IP) address of the CU. The identifier for the DU can be the DU ID and/or the IP address of the DU. The information of the measured object(s) can include a Data Radio Bearer (DRB) ID, or a combination of DRB IDs.

The DU then transmits, at 603, a second message (e.g., a Time Delay Response) to the CU in response to the first message. The second message can include at least one of the following types of information: an identifier for the CU, an identifier for the UD, and/or the average data delay(s) for the measurement object(s). The identifier for the CU can be the CU Identity (ID) and/or the Internet Protocol (IP) address of the CU. The identifier for the DU can be the DU ID and/or the IP address of the DU. In some embodiments, for each measured object (e.g., data traffic that corresponds to a DRB ID), a corresponding T value (e.g., $$T = \frac{\sum_{i=1}^{N}(t_{1(i)} + t_{2(i)} + t_F)}{N} \text{ or } T = T_1 + T_2 + t_F)$$

indicating the average data delay for the measured object is included in the second message.

Example Embodiment 2

Figure 7:
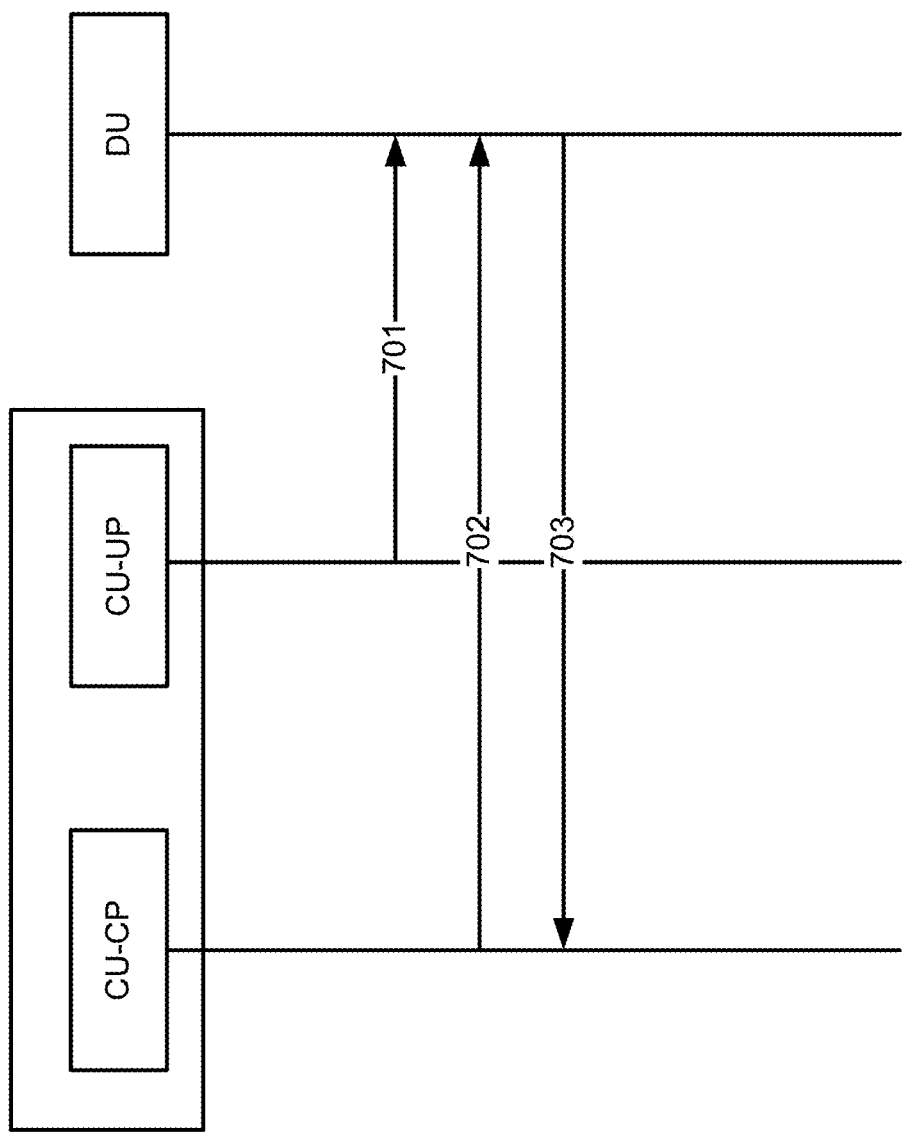
FIG. 7 shows another representative signaling procedure between a CU and a DU for obtaining a transmission delay for data packets.

FIG. 7 shows a representative signaling procedure between a CU and a DU for obtaining a transmission delay for data packets. In this embodiment, the delay is computed on the DU side. The CP and the UP of the CU are separated—the CU includes CU-CP and CU-UP physically located in different locations.

The CU-UP first gathers delay information for data packets that are received at the CU-UP. In some embodiments, the CU-UP gathers delay information for N data packets, wherein N is a predetermined number. In some implementations, the CU-UP gathers delay information for data packets that are received within a predetermined time duration $T_s$.

In some embodiments, the delay information includes the delay at the CU-UP for each of the data packets. For example, data packet $d_k$ arrives at the CU-UP at time $t_{a1(k)}$. The data packet $d_k$ is transmitted from the CU-UP at $t_{b1(k)}$. Thus, the delay at the CU-UP for data packet $d_k$ is $t_{1(k)} = t_{b1(k)} - t_{a1(k)}$. For each of the data packet $1 \le i \le N$, the corresponding delay at the CU-UP is $t_{1(i)}$. The data packets are subsequently forwarded to the DU.

The CU-UP then, at step 701, transmits the delay information to the DU. In this embodiment, because the CP and the UP of the CU are separated, the delay information can be included in one or more downlink data frames. In some embodiments, the CU-UP can transmit $t_{i(i)}$ to the DU via downlink data frames. In some embodiments, the CU-UP can compute an average value of $t_{1(i)}$:

$$T_1 = \frac{\sum_{i=1}^{N} t_{1(i)}}{N},$$

and transmit the average value $T_1$ to the DU via the downlink data frames.

On the DU side, DU also gathers delay information for the data packets that are received at the DU from the CU-UP. The DU may gather delay information for N data packets, or within a predetermined time duration $T_s$.

In some embodiments, the delay information includes the delay at the DU for each of the data packets it received from the CU-UP. For example, data packet $d_k$ arrives at the DU at time $t_{a2(k)}$. The data packet $d_k$ is then transmitted to a UE. An acknowledge (ACK) corresponding to the data packet $d_k$ is received at the DU at time $t_{b2(k)}$. Thus, the delay at the DU for data packet $d_k$ is $t_{2(k)} = t_{b2(k)} - t_{a2(k)}$. For each of the data packet $1 \le i \le N$, the corresponding delay at the DU is $t_{2(i)}$. In some embodiments, the DU can compute an average value of $t_{2(i)}$:

$$T_2 = \frac{\sum_{i=1}^{N} t_{2(i)}}{N}.$$

After the DU obtains both $t_{1(i)}$ and $t_{2(i)}$ for N data packets, the DU can compute an average transmission delay for the data packets:

$$T = \frac{\sum_{i=1}^{N}(t_{1(i)} + t_{2(i)} + t_F)}{N}.$$

In some embodiments, the DU obtains both $T_1$ and $T_2$, and computes the average transmission delay as follows: $T = T_1 + T_2 + t_F$. Here, $t_F$ is the time delay of the fronthaul interface (e.g., F1-U interface) between the CU-UP and the DU. The value of $t_F$ can be a fixed (optionally preconfigured) value, or be obtained based on measurements.

The CU-CP transmits, at 702, a first message (e.g., a Time Delay Request) to the DU to request the transmission delay. The first message can include at least one of the following types of information: an identifier for the CU-CP, an identifier for the DU, and/or information of the measured object(s). The identifier for the CU-CP can be the CU-CP Identity (ID) and/or the Internet Protocol (IP) address of the CU-CP. The identifier for the DU can be the DU ID and/or the IP address of the DU. The information of the measured object(s) can include a Data Radio Bearer (DRB) ID, or a combination of DRB IDs.

The DU then transmits, at 703, a second message (e.g., a Time Delay Response) to the CU-CP in response to the first message. The second message can include at least one of the following types of information: an identifier for the CU-CP, an identifier for the UD, and/or the average data delay(s) for the measurement object(s). The identifier for the CU-CP can be the CU-CP Identity (ID) and/or the Internet Protocol (IP) address of the CU-CP. The identifier for the DU can be the DU ID and/or the IP address of the DU. In some embodiments, for each measured object (e.g., data traffic that corresponds to a DRB ID), a corresponding T value $$\left(e.g., T = \frac{\sum_{i=1}^{N}(t_{1(i)} + t_{2(i)} + t_F)}{N} \text{ or } T = T_1 + T_2 + t_F\right)$$

indicating the average data delay for the measured object is included in the second message.

Example Embodiment 3

Figure 8:
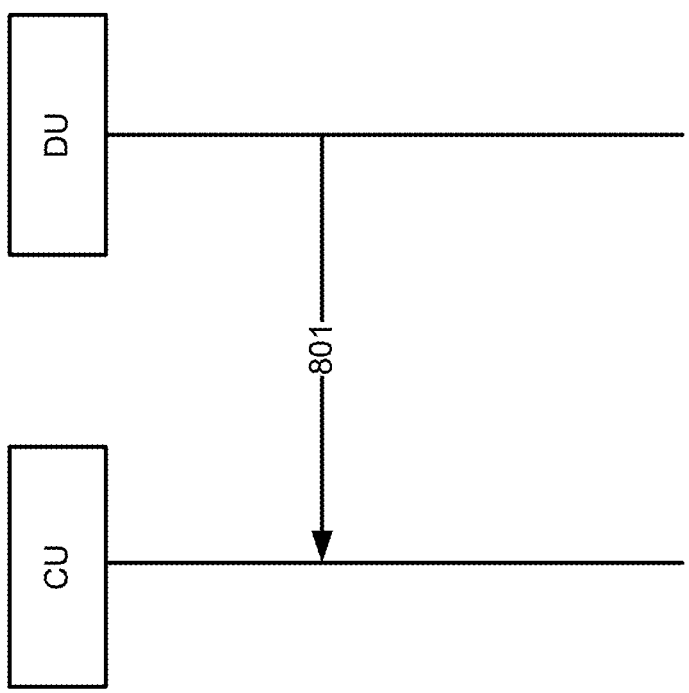
FIG. 8 shows another representative signaling procedure between a CU and a DU for obtaining a transmission delay for data packets.

FIG. 8 shows a representative signaling procedure between a CU and a DU for obtaining a transmission delay for data packets. In this embodiment, the delay is computed on the CU side. The CP and the UP of the CU are not separated.

The CU first gathers delay information for data packets that are received at the CU. In some embodiments, the CU gathers delay information for N data packets, wherein N is a predetermined number. In some implementations, the CU gathers delay information for data packets that are received within a predetermined time duration $T_s$.

In some embodiments, the delay information includes the delay at the CU for each of the data packets. For example, data packet $d_k$ arrives at the CU at time $t_{a1(k)}$. The data packet $d_k$ is transmitted from the CU at $t_{b1(k)}$. Thus, the delay at the CU for data packet $d_k$ is $t_{1(k)} = t_{b1(k)} - t_{a1(k)}$. For each of the data packet 1≤i≤N, the corresponding delay at the CU is $t_{1(i)}$. The data packets are subsequently forwarded to the DU.

On the DU side, DU also gathers delay information for the data packets that are received at the DU from the CU. The DU may gather delay information for N data packets, or within a predetermined time duration $T_s$.

In some embodiments, the delay information includes the delay at the DU for each of the data packets it received from the CU. For example, data packet $d_k$ arrives at the DU at time $t_{a2(k)}$. The data packet $d_k$ is then transmitted to a User Equipment (UE). An acknowledge (ACK) corresponding to the data packet $d_k$ is received at the DU at time $t_{b2(k)}$. Thus, the delay for data packet $d_k$ is $t_{2(k)} = t_{b2(k)} - t_{a2(k)}$. For each of the data packet 1≤i≤N, the corresponding delay at the DU is $t_{2(i)}$. In some embodiments, the DU can compute an average value:

$$T_2 = \frac{\sum_{i=1}^{N} t_{2(i)}}{N}.$$

After the DU obtains $t_{2(i)}$ for N data packets, the DU can transmit, at 801, the delay information to the CU. Because the CP and the UP of the CU are not separated, the delay information can be included in a message (e.g., a Delay Measurement Assistant Information) and transmitted to the CU via the control plane. The message can include at least one of the following types of information: an identifier for the CU, an identifier for the DU, and/or information of the measured object(s). The identifier for the CU can be the CU Identity (ID) and/or the Internet Protocol (IP) address of the CU. The identifier for the DU can be the DU ID and/or the IP address of the DU. The information of the measured object(s) can include a Data Radio Bearer (DRB) ID, or a combination of DRB IDs.

After the CU obtains both $t_{1(i)}$ and $t_{2(i)}$ for N data packets, the CU can compute an average transmission delay for the data packets:

$$T = \frac{\sum_{i=1}^{N} (t_{1(i)} + t_{2(i)} + t_F)}{N}.$$

In some embodiments, the CU obtains both $T_1$ and $T_2$, and computes the average transmission delay as follows: $T=T_1+T_2+t_F$. Here, $t_F$ is the time delay of the fronthaul interface (e.g., F1 interface) between the CU and the DU. The value of $t_F$ can be a fixed (optionally preconfigured) value, or obtained based on measurements.

Example Embodiment 4

Figure 9:
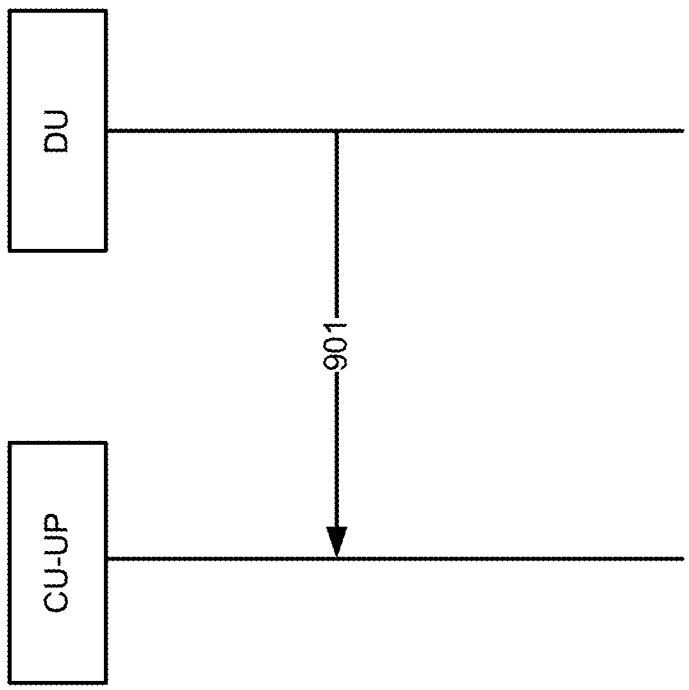
FIG. 9 shows another representative signaling procedure between a CU and a DU for obtaining a transmission delay for data packets.

FIG. 9 shows a representative signaling procedure between a CU and a DU for obtaining a transmission delay for data packets. In this embodiment, the CP and the UP of the CU are separated. The delay is computed by the CU-UP side.

The CU-UP gathers delay information for data packets that are received at the CU-UP. In some embodiments, the CU-UP gathers delay information for N data packets, wherein N is a predetermined number. In some implementations, the CU-UP gathers delay information for data packets that are received within a predetermined time duration $T_s$.

In some embodiments, the delay information includes the delay at the CU-UP for each of the data packets. For example, data packet $d_k$ arrives at the CU-UP at time $t_{a1(k)}$. The data packet $d_k$ is transmitted from the CU at $t_{b1(k)}$. Thus, the delay at the CU-UP for data packet $d_k$ is $t_{1(k)} = t_{b1(k)} - t_{a1(k)}$. For each of the data packet 1≤i≤N, the corresponding delay at the CU-UP is $t_{1(i)}$. The data packets are subsequently forwarded to the DU.

On the DU side, DU also gathers delay information for the data packets that are received at the DU from the CU. The DU may gather delay information for N data packets, or within a predetermined time duration $T_s$.

In some embodiments, the delay information includes the delay at the DU for each of the data packets it received from the CU-UP. For example, data packet $d_k$ arrives at the DU at time $t_{a2(k)}$. The data packet $d_k$ is then transmitted to a User Equipment (UE). An acknowledge (ACK) corresponding to the data packet $d_k$ is received at the DU at time $t_{b2(k)}$. Thus, the delay for data packet $d_k$ is $t_{2(k)} = t_{b2(k)} - t_{a2(k)}$. For each of the data packet 1≤i≤N, the corresponding delay at the DU is $t_{2(i)}$. In some embodiments, the DU can compute an average value of $t_{2(i)}$:

$$T_2 = \frac{\sum_{i=1}^{N} t_{2(i)}}{N}.$$

After the DU obtains $t_{2(i)}$ for N data packets, the DU can transmit, at 901, the delay information to the CU-UP. Because the CP and the UP of the CU are separated, the delay information can be included in an uplink data frame or in a Downlink Data Delivery Status (DDDS) frame from DU to CU. The delay information can include at least one of the following types of information: an identifier for the CU-UP, an identifier for the DU, and/or information of the measured object(s). The identifier for the CU-UP can be the CU-UP Identity (ID) and/or the Internet Protocol (IP) address of the CU-UP. The identifier for the DU can be the DU ID and/or the IP address of the DU. The information of the measured object(s) can include a Data Radio Bearer (DRB) ID, or a combination of DRB IDs.

After the CU-UP obtains both $t_{1(i)}$ and $t_{2(i)}$ for N data packets, the CU-UP can compute an average transmission delay for the data packets $$T = \frac{\sum_{i=1}^{N} (t_{1(i)} + t_{2(i)} + t_F)}{N}.$$

In some embodiments, the CU-UP obtains $T_1$ and $T_2$, and computes the average transmission delay as follows: $T=T_1+T_2+t_F$. Here, $t_F$ is the time delay of the fronthaul interface (e.g., F1-U interface) between the CU-UP and the DU. The value of $t_F$ can be a fixed (optionally preconfigured) value, or obtained based on measurements.

Example Embodiment 5

Figure 10:
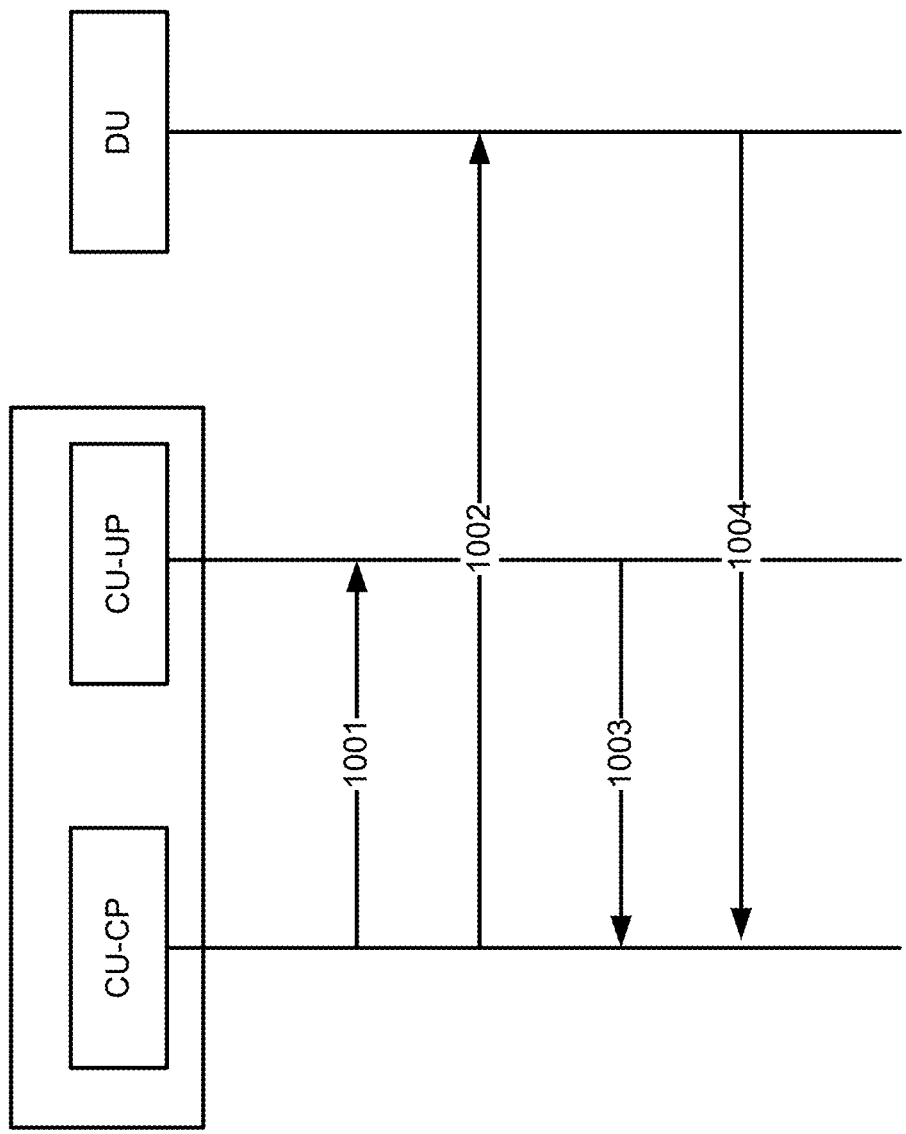
FIG. 10 shows another representative signaling procedure between a CU and a DU for obtaining a transmission delay for data packets.

FIG. 10 shows a representative signaling procedure between a CU and a DU for obtaining a transmission delay for data packets. In this embodiment, the CP and the UP of the CU are separated. The delay is computed by the CU-CP side.

The CU-UP first gathers delay information for data packets that are received at the CU-UP. In some embodiments, the CU-UP gathers delay information for N data packets, wherein N is a predetermined number. In some implementations, the CU-UP gathers delay information for data packets that are received within a predetermined time duration $T_s$.

In some embodiments, the delay information includes the delay at the CU-UP for each of the data packets. For example, data packet $d_k$ arrives at the CU-UP at time $t_{a1(k)}$. The data packet $d_k$ is transmitted from the CU at $t_{b1(k)}$. Thus, the delay at the CU-UP for data packet $d_k$ is $t_{1(k)} = t_{b1(k)} - t_{a1(k)}$. For each of the data packet 1≤i≤N, the corresponding delay at the CU-UP is $t_{1(i)}$. The data packets are subsequently forwarded to the DU.

On the DU side, DU also gathers delay information for the data packets that are received at the DU from the CU. The DU may gather delay information for N data packets, or within a predetermined time duration $T_s$.

In some embodiments, the delay information includes the delay at the DU for each of the data packets it received from the CU-UP. For example, data packet $d_k$ arrives at the DU at time $t_{a2(k)}$. The data packet $d_k$ is then transmitted to a User Equipment (UE). An acknowledge (ACK) corresponding to the data packet $d_k$ is received at the DU at time $t_{b2(k)}$. Thus, the delay at for data packet $d_k$ is $t_{2(k)} = t_{b2(k)} - t_{a2(k)}$. For each of the data packet 1≤i≤N, the corresponding delay at the DU is $t_{2(i)}$. In some embodiments, the DU can compute an average value of $t_{2(i)}$:

$$T_2 = \frac{\sum_{i=1}^{N} t_{2(i)}}{N}.$$

The CU-CP transmits, at step 1001, a first message (e.g., a Delay Information Retrieval) to request delay information after the CU-UP obtains $t_{1(i)}$ for N data packets. The first message can include at least one of the following types of information: an identifier for the CU-CP, an identifier for the CU-UP, and/or information of the measured object(s). The identifier for the CU-CP can be the CU-CP Identity (ID) and/or the Internet Protocol (IP) address of the CU-CP. The identifier for the CU-UP can be the CU-UP ID and/or the IP address of the CU-UP. The information of the measured object(s) can include a Data Radio Bearer (DRB) ID, or a combination of DRB IDs.

The CU-CP also transmits, at step 1002, a second message (e.g., a Delay Information Request) to request delay information after the DU obtains $t_{2(i)}$ for N data packets. The second message can include at least one of the following types of information: an identifier for the CU-CP, an identifier for the DU, and/or information of the measured object(s). The identifier for the CU-CP can be the CU-CP Identity (ID) and/or the Internet Protocol (IP) address of the CU-CP. The identifier for the DU can be the DU ID and/or the IP address of the DU. The information of the measured object(s) can include a Data Radio Bearer (DRB) ID, or a combination of DRB IDs.

The CU-CP then transmits, at step 1003, a third message (e.g., a Delay Information Retrieval Response) to the CU-CP in response to the first message. The third message can include at least one of the following types of information: an identifier for the CU-CP, an identifier for the CU-UP, and/or information of the measured object(s). The identifier for the CU-CP can be the CU-CP Identity (ID) and/or the Internet Protocol (IP) address of the CU-CP. The identifier for the CU-UP can be the CU-UP ID and/or the IP address of the CU-UP. In some embodiments, for each measured object (e.g., data traffic that corresponds to a DRB ID), one or more corresponding values (e.g., $t_{1(i)}$ or $T_1$) indicating the delay information can be included in the second message.

The DU then transmits, at step 1004, a fourth message (e.g., a Delay Information Response) to the CU-CP in response to the second message. The fourth message can include at least one of the following types of information: an identifier for the CU-CP, an identifier for the DU, and/or the delay information for the measurement object(s). The identifier for the CU-CP can be the CU-CP Identity (ID) and/or the Internet Protocol (IP) address of the CU-CP. The identifier for the DU can be the DU ID and/or the IP address of the DU. In some embodiments, for each measured object (e.g., data traffic that corresponds to a DRB ID), one or more corresponding values (e.g., $t_{2(i)}$ or $T2$) indicating the delay information can included in the fourth message.

After the CU-CP obtains both $t_{1(i)}$ and $t_{2(i)}$ for N data packets, the CU-CP can compute an average transmission delay for the data packets:

$$T = \frac{\sum_{i=1}^{N} (t_{1(i)} + t_{2(i)} + t_F)}{N}.$$

In some embodiments, the CU-CP obtains $T_1$ and $T_2$, and computes the average transmission delay as follows: $T=T_1+T_2+t_F$. Here, $t_F$ is the time delay of the fronthaul interface (e.g., F1-U interface) between the CU-UP and the DU. The value of $t_F$ can be a fixed (optionally preconfigured) value, or be obtained based on measurements.

Example Embodiment 6

Figure 11:
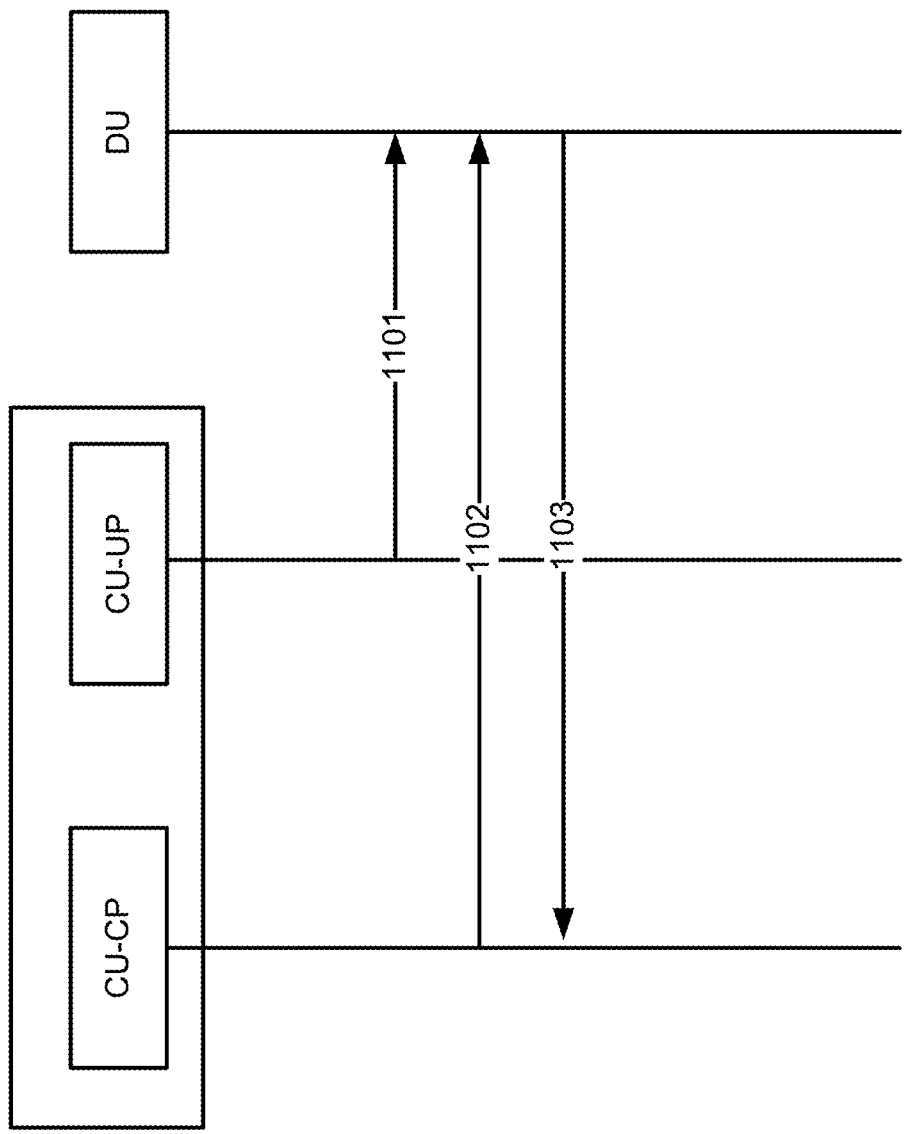
FIG. 11 shows another representative signaling procedure between a CU and a DU for obtaining a transmission delay for data packets.

FIG. 11 shows a representative signaling procedure between a CU and a DU for obtaining a transmission delay for data packets. In this embodiment, the delay is computed on the DU side. The CP and the UP of the CU are separated.

The CU-UP first gathers delay information for data packets that are received at the CU-UP. In some embodiments, the CU-UP gathers delay information for N data packets, wherein N is a predetermined number. In some implementations, the CU-UP gathers delay information for data packets that are received within a predetermined time duration $T_s$.

In some embodiments, the delay information includes the time of arrival at the CU-UP for each of the data packets. For example, each of the data packet 1≤i≤N arrives at the CU-UP at $t_{a(i)}$. The data packets are subsequently forwarded to the DU. The CU-UP then, at step 1101, transmits the delay information to the DU. In this embodiment, because the CP and the UP of the CU are separated, the delay information can be included in downlink data frames (e.g., in the GTP headers).

On the DU side, DU also gathers delay information for the data packets that are received at the DU from the CU-UP. The DU may gather delay information for N data packets, or within a predetermined time duration $T_s$. In some embodiments, the delay information includes the time when the DU receives acknowledgements for the data packets. For example, an acknowledge (ACK) corresponding to each of data packet $d_{ki}$ is received at the DU at time $t_{b(i)}$.

The DU can compute a transmission delay for each of the data packets based on $t_{a(i)}$ and $t_{b(i)}$: $t(i)=t_{b(i)}-t_{a(i)}$. In some embodiments, the DU can compute an average transmission delay for the data packets:

$$T = \frac{\sum_{i=1}^{N} t(i)}{N}.$$

The CU-CP transmits, at 1102, a first message (e.g., a Time Delay Request) to the DU to request the transmission delay. The first message can include at least one of the following types of information: an identifier for the CU-CP, an identifier for the DU, and/or information of the measured object(s). The identifier for the CU-CP can be the CU-CP Identity (ID) and/or the Internet Protocol (IP) address of the CU-CP. The identifier for the DU can be the DU ID and/or the IP address of the DU. The information of the measured object(s) can include a Data Radio Bearer (DRB) ID, or a combination of DRB IDs.

The DU then transmits, at 1103, a second message (e.g., a Time Delay Response) to the CU-CP in response to the first message. The second message can include at least one of the following types of information: an identifier for the CU-CP, an identifier for the UD, and/or the average data delay(s) for the measurement object(s). The identifier for the CU-CP can be the CU-CP Identity (ID) and/or the Internet Protocol (IP) address of the CU-CP. The identifier for the DU can be the DU ID and/or the IP address of the DU. In some embodiments, for each measured object (e.g., data traffic that corresponds to a DRB ID), a corresponding T value $$\left(e.g., T = \frac{\sum_{i=1}^{N} t(i)}{N}\right)$$

indicating the average data delay for the measured object is included in the second message.

Example Embodiment 7

Figure 12:
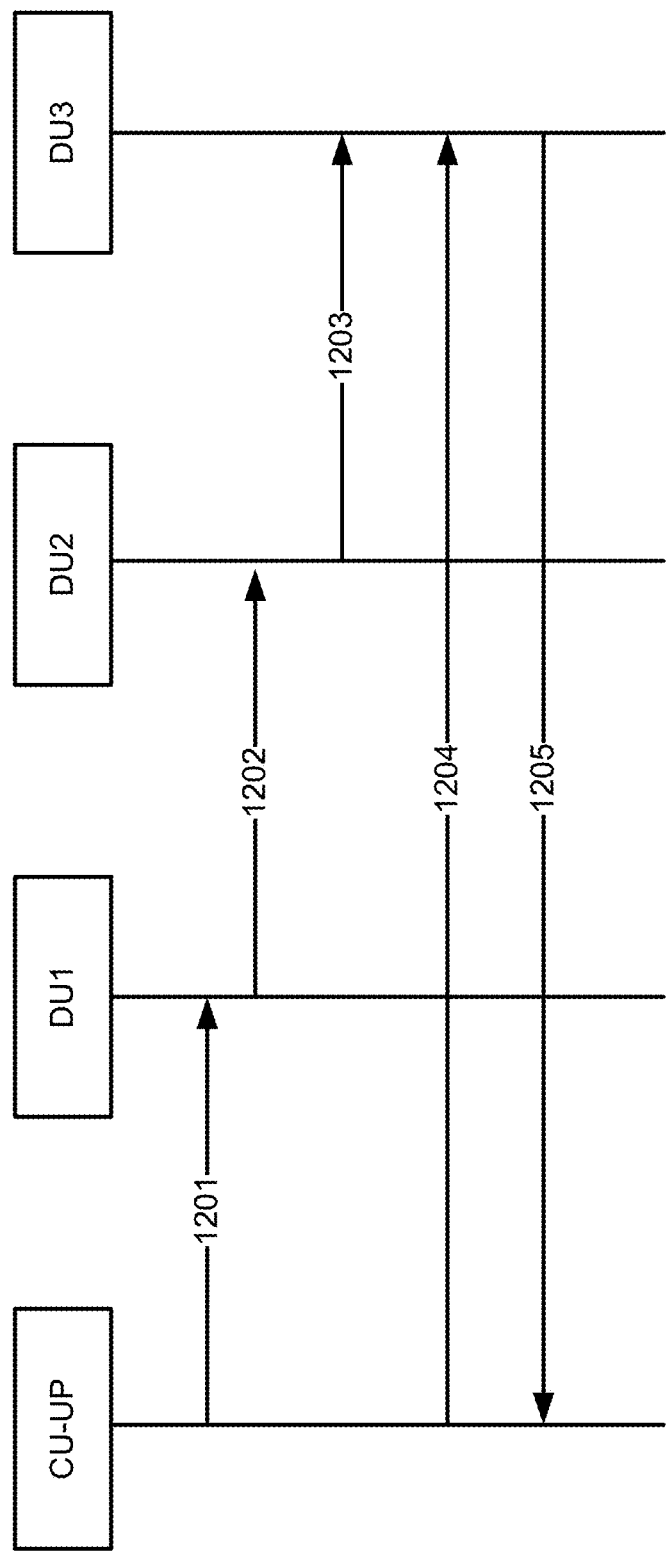
FIG. 12 shows a representative signaling procedure between a CU and multiple levels of DUs for obtaining a transmission delay for data packets.
Figure 14A:
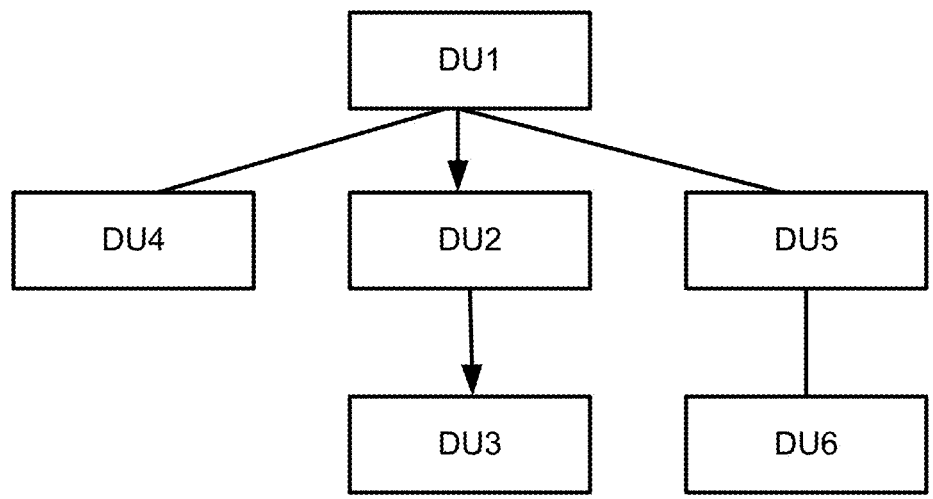
FIG. 14A shows a representative hierarchical topology in which DUs are organized.

FIG. 12 shows a representative signaling procedure between a CU and multiple levels of DUs for obtaining a transmission delay for data packets. In this embodiment, the DUs are organized hierarchically, as shown in FIG. 14A.

The CU first gathers delay information for data packets that are received at the CU. In some embodiments, the CU gathers delay information for N data packets, wherein N is a predetermined number. In some implementations, the CU gathers delay information for data packets that are received within a predetermined time duration $T_s$.

In some embodiments, the delay information includes the time of arrival at the CU for each of the data packets. For example, each of the data packet $1 \le i \le N$ arrives at the CU at $t_{a(i)}$. The data packets are subsequently forwarded to the DUs, from DU1 to DU2 and to DU3. The CU then, at step 1201, transmits the delay information to the DU1. In this embodiment, because the CP and the UP of the CU are separated, the delay information can be included in downlink data frames (e.g., in the GTP headers).

The intermediate DUs (e.g., DU1, DU2) can forward the delay information (e.g., $t_{a(i)}$) to the last DU3. The last DU3 gathers delay information for the data packets that are received at the DU3. The DU3 may gather delay information for N data packets, or within a predetermined time duration $T_s$. In some embodiments, the delay information includes the time when the DU3 receives acknowledgements for the data packets. For example, an acknowledge (ACK) corresponding to each of data packet $d_{ki}$ is received at the DU3 at time $t_{b(i)}$.

The DU3 can compute a transmission delay for each of the data packets based on $t_{a(i)}$ and $t_{b(i)}$: $t(i)=t_{b(i)}-t_{a(i)}$. In some embodiments, the DU3 can compute an average transmission delay for the data packets:

$$T = \frac{\sum_{i=1}^{N} t(i)}{N}.$$

The CU-CP transmits, at 1202, a first message (e.g., a Time Delay Request) to the last DU3 to request the transmission delay. The first message can include at least one of the following types of information: an identifier for the CU-CP, an identifier for the DU, and/or information of the measured object(s). The identifier for the CU-CP can be the CU-CP Identity (ID) and/or the Internet Protocol (IP) address of the CU-CP. The identifier for the DU can be the DU ID and/or the IP address of the DU. The information of the measured object(s) can include a Data Radio Bearer (DRB) ID, or a combination of DRB IDs.

The last DU then transmits, at 1203, a second message (e.g., a Time Delay Response) to the CU-CP in response to the first message. The second message can include at least one of the following types of information: an identifier for the CU-CP, an identifier for the UD, and/or the average data delay(s) for the measurement object(s). The identifier for the CU-CP can be the CU-CP Identity (ID) and/or the Internet Protocol (IP) address of the CU-CP. The identifier for the DU can be the DU ID and/or the IP address of the DU. In some embodiments, for each measured object (e.g., data traffic that corresponds to a DRB ID), a corresponding T value $$\left(e.g., T = \frac{\sum_{i=1}^{N} t(i)}{N}\right)$$

indicating the average data delay for the measured object is included in the second message.

Example Embodiment 8

Figure 13:
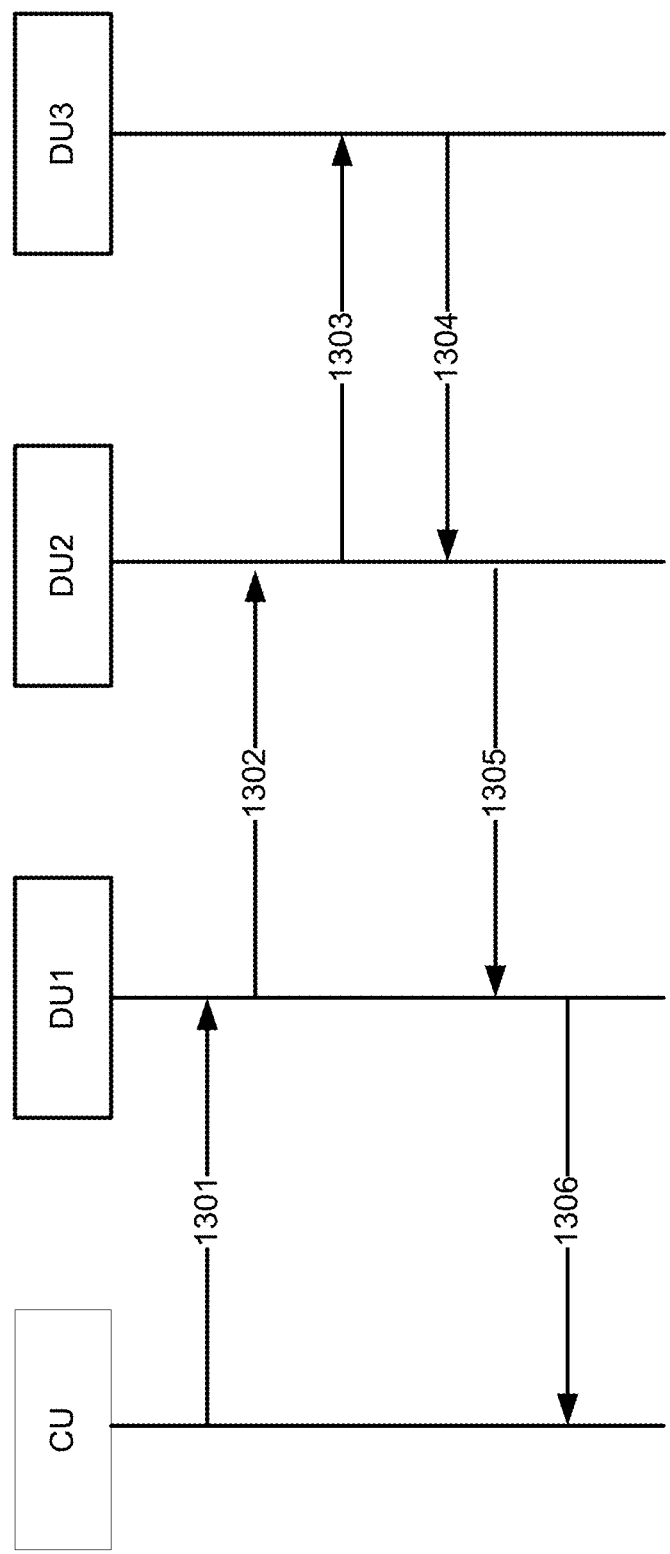
FIG. 13 shows another representative signaling procedure between a CU and multiple DUs for obtaining a transmission delay for data packets.
Figure 14B:
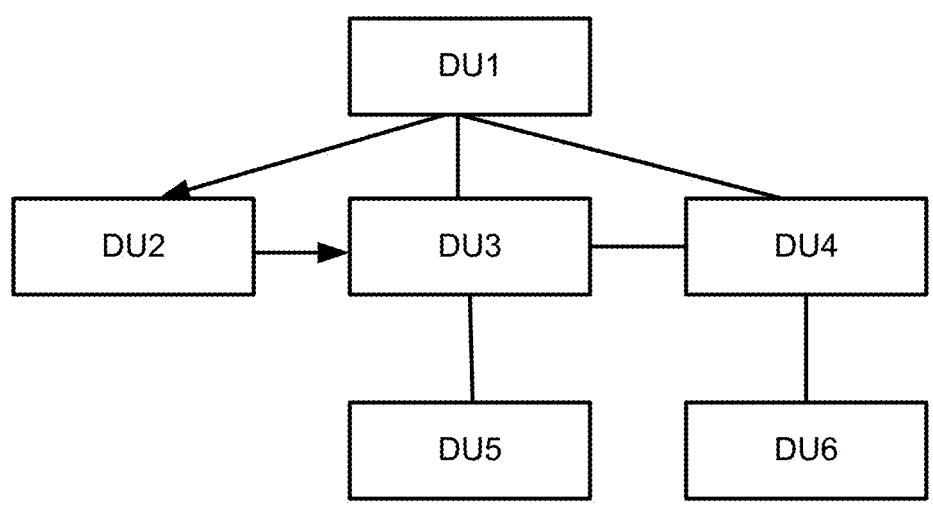
FIG. 14B shows a representative mesh topology in which DUs are organized.

FIG. 13 shows another representative signaling procedure between a CU and multiple DUs for obtaining a transmission delay for data packets. In this embodiment, the DUs are organized in a mesh topology, as shown in FIG. 14B.

The information element can gather delay information for data packets that are received at the information element. In some embodiments, the CU gathers delay information for N data packets, wherein N is a predetermined number. In some implementations, the CU gathers delay information for data packets that are received within a predetermined time duration $T_s$.

In some embodiments, the delay information includes the delay for each of the data packets arriving at the CU. For example, data packet $d_k$ arrives at the CU at time $t_{a0(k)}$. The data packet $d_k$ is transmitted from the CU DU at $t_{b0(k)}$. Thus, the delay at the CU for data packet $d_k$ is $t_{0(k)} = t_{b0(k)} - t_{a0(k)}$. For each of the data packet $1 \leq i \leq N$, the corresponding delay at the CU is $t_{0(i)}$. The data packets are subsequently forwarded to the DUs (including DU1, DU2, and DU3).

Each DU also gathers delay information for the data packets that are received at the DU from the CU. The DU may gather delay information for N data packets, or within a predetermined time duration $T_s$.

For DUm, the delay information includes the delay at the DUm for each of the data packets it received from the previous information element. For example, data packet $d_k$ arrives at the DUm at time $t_{am(k)}$. The data packet $d_k$ is then transmitted to the next information element at time $t_{bm(k)}$. Thus, the delay for data packet $d_k$ is $t_{m(k)} = t_{bm(k)} - t_{am(k)}$. For each of the data packet $1 \leq i \leq N$, the corresponding delay at the DUm is $t_{m(i)}$. In some embodiments, the DU can compute an average value of $t_{m(i)}$.

The CU transmits, at 1301, a first message (e.g., a Delay Information Request) to the DU1 to request delay information. The DU1 then transmits, at 1302, a second message (e.g., a Delay Information Request) to the DU2 to request delay information. The DU2 subsequently transmits, at 1303, a third message (e.g., a Delay Information Request) to the DU3 to request delay information.

The DU3 transmits, at 1304, a fourth message (e.g., a Delay Information Response) to the DU2 in response to the third message. The fourth message can include at least one of the following types of information: an identifier for the DU3, an identifier for the DU2, and/or the delay information for the measurement object(s). The identifier for the DU3 can be the DU3 Identity (ID) and/or the Internet Protocol (IP) address of the DU3. The identifier for the DU2 can be the DU2 ID and/or the IP address of the DU2. In some embodiments, for each measured object (e.g., data traffic that corresponds to a DRB ID), one or more corresponding values (e.g., $t_{3(i)}$ or an average of $t_{3(i)}$) indicating the delay information can included in the fourth message.

After receiving the fourth message, the DU2 transmits, at 1305, a fifth message (e.g., a Delay Information Response) to the DU1 in response to the second message. The fifth message can include at least one of the following types of information: an identifier for the DU2, an identifier for the DU1, and/or the delay information for the measurement object(s). The identifier for the DU2 can be the DU2 Identity (ID) and/or the Internet Protocol (IP) address of the DU2. The identifier for the DU1 can be the DU1 ID and/or the IP address of the DU1. In some embodiments, for each measured object (e.g., data traffic that corresponds to a DRB ID), one or more corresponding values (e.g., $t_{2(i)} + t_{3(i)}$ or an average of $t_{2(i)} + t_{3(i)}$) indicating the delay information can included in the fifth message.

After receiving the fourth message, the DU1 transmits, at 1306, a sixth message (e.g., a Delay Information Response) to the CU in response to the first message. The sixth message can include at least one of the following types of information: an identifier for the DU1, an identifier for the CU, and/or the delay information for the measurement object(s). The identifier for the DU1 can be the DU1 Identity (ID) and/or the Internet Protocol (IP) address of the DU1. The identifier for the CU can be the CU ID and/or the IP address of the CU. In some embodiments, for each measured object (e.g., data traffic that corresponds to a DRB ID), one or more corresponding values (e.g., $t_{1(i)} + t_{2(i)} + t_{3(i)}$ or an average of $t_{1(i)} + t_{2(i)} + t_{3(i)}$) indicating the delay information can included in the sixth message.

After the CU obtains the delay information for N data packets, the CU can compute an average transmission delay for the data packets based on its own measurements and the delay information obtained in the sixth message:

$$T = \frac{\sum_{i=1}^{N} \sum_{j=1}^{3} t_j(i)}{N}.$$

It is thus evident that methods and corresponding apparatus relating to measuring and obtaining transmission delay of data packets by separated information elements (e.g., CU and/or DU) in an NR network are disclosed. The disclosed techniques can be used in various embodiments to enhance the SON capabilities of the information elements, thereby improving performance of the network.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communication, comprising:
    receiving, at a Distributed Unit configured to perform delay sensitive network functions, delay information from a user plane node of a Centralized Unit for data packets transmitted from the Centralized Unit to the Distributed Unit, wherein the Centralized Unit is configured to perform delay-insensitive network functions;
    determining, by the Distributed Unit, a transmission delay of the data packets based on the delay information;
    receiving, at the Distributed Unit, a first message from a control plane node of the Centralized Unit that is separate from the user plane node requesting the transmission delay of the data packets; and
    transmitting, from the Distributed Unit in response to the first message, a second message to the control plane node of the Centralized Unit, the second message including the transmission delay for the data packets.

2. The method of claim 1, wherein determining the transmission delay of the data packets comprises:
    performing, by the Distributed Unit, delay measurements of the data packets; and
    computing, by the Distributed Unit, the transmission delay of the data packets based on the delay information and the delay measurements.

3. The method of claim 1, wherein the delay information is carried in (1) a message that is transmitted via the control plane node of the Centralized Unit for carrying control traffic, or (2) a data frame that is transmitted via the user plane node of the Centralized Unit for carrying data traffic.

4. The method of claim 1, wherein the delay information includes at least (1) a timestamp for each data packet, the timestamp indicating a time at which the corresponding data packet is received at the user plane node of the Centralized Unit, or (2) a time duration for each data packet, the time duration indicating an amount of delay for the corresponding data packet at the user plane node of the Centralized Unit.

5. The apparatus of claim 1, wherein the delay information includes at least (1) a timestamp for each data packet, the timestamp indicating a time at which the corresponding data packet is received at the user plane node of the Centralized Unit, or (2) a time duration for each data packet, the time duration indicating an amount of delay for the corresponding data packet at the user plane node of the Centralized Unit.

6. A method for wireless communication, comprising:
    transmitting, from a user plane node of a Centralized Unit, wherein the Centralized Unit is configured to perform delay-insensitive network functions, delay information to a Distributed Unit for data packets transmitted from the Centralized Unit to the Distributed Unit, wherein the Distributed Unit is configured to perform delay sensitive network functions;
    transmitting, from a control plane node of the Centralized Unit that is separate from the user plane node, a first message to the Distributed Unit requesting a transmission delay of the data packets; and
    receiving, at the control plane node of the Centralized Unit, a second message from the Distributed Unit in response to the first message, the second message including the transmission delay of the data packets.

7. The method of claim 6, wherein the delay information is carried in a message that is transmitted via the control plane node of the Centralized Unit for carrying control traffic.

8. The method of claim 6, wherein the delay information is carried in a data frame that is transmitted via the user plane node of the Centralized Unit for carrying data traffic.

9. The method of claim 6, wherein the delay information includes (1) a timestamp for each data packet, the timestamp indicating a time at which the corresponding data packet is received at the user plane node of the Centralized Unit, or (2) a time duration for each data packet, the time duration indicating an amount of delay for the corresponding data packet at the user plane node of the Centralized Unit.

10. An apparatus for wireless communication comprising a processor and a memory storing instructions, which when executed by the processor, causes the apparatus to:
receive delay information from a user plane node of a Centralized Unit for data packets transmitted from Centralized node, wherein the Centralized Unit is configured to perform delay-insensitive network functions;
determine a transmission delay of the data packets based on the delay information;
receive a first message from a control plane node of the Centralized Unit that is separate from the user plane node requesting the transmission delay of the data packets; and
transmit, in response to the first message, a second message to the control plane node of the Centralized Unit, the second message including the transmission delay for the data packets.

11. The apparatus of claim 10, wherein the processor is configured to determine the transmission delay of the data packets based on:
performing delay measurements of the data packets; and
computing the transmission delay of the data packets based on the delay information and the delay measurements.

12. The apparatus of claim 1, wherein the delay information is carried in (1) a message that is transmitted via the control plane node of the Centralized Unit for carrying control traffic, or (2) a data frame that is transmitted via the user plane node of the Centralized Unit for carrying data traffic.

13. An apparatus for wireless communication comprising a processor and a memory storing instructions, which when executed by the processor, cause the apparatus to:
transmit, from a user plane node, delay information to Distributed Unit, wherein the Distributed Unit is configured to perform delay-sensitive network functions;
transmit, from a control plane node separate from the user plane node, a first message to the Distributed Unit requesting a transmission delay of the data packets; and
receive, at the control plane node, a second message from the Distributed Unit in response to the first message, the second message including the transmission delay of the data packets.

14. The apparatus of claim 13, wherein the delay information is carried in a message that is transmitted via the control plane for carrying control traffic.

15. The apparatus of claim 13, wherein the delay information is carried in a data frame that is transmitted via the user plane for carrying data traffic.

16. The apparatus of claim 13, wherein the delay information includes (1) a timestamp for each data packet, the timestamp indicating a time at which the corresponding data packet is received at the user plane node, or (2) a time duration for each data packet, the time duration indicating an amount of delay for the corresponding data packet at the user plane node.

* * * * *

UNITED STATES PATENT AND TRADEMARK OFFICE
CERTIFICATE OF CORRECTION

| | |
|---|---|
| PATENT NO. | : 11,329,926 B2 |
| APPLICATION NO. | : 17/061392 |
| DATED | : May 10, 2022 |
| INVENTOR(S) | : Yang Liu |

It is certified that error appears in the above-identified patent and that said Letters Patent is hereby corrected as shown below:

On the Title Page

First Column (63) Related U.S. Application Data:
Delete "PCT/US2018/081794" and insert --PCT/CN2018/081794-- therefor Signed and Sealed this
Fifteenth Day of November, 2022

Katherine Kelly Vidal
*Director of the United States Patent and Trademark Office*